No. 638,860. Patented Dec. 12, 1899.
R. M. AUSTIN.
CULINARY DEVICE FOR FRYING OR ROASTING MEATS.
(Application filed Sept. 14, 1897.)
(No Model.)
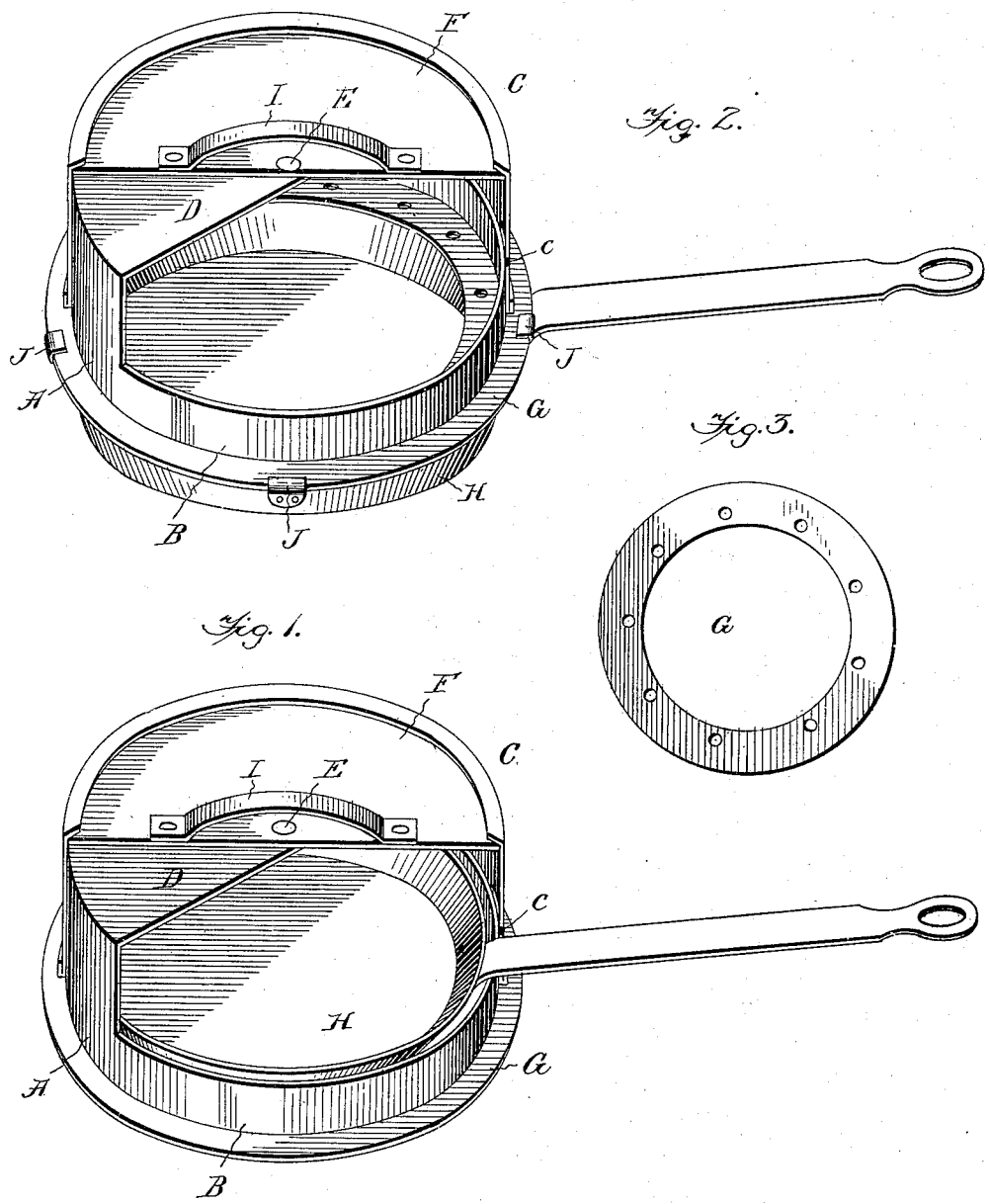
Witnesses
Inventor
Robert M. Austin
by A. H. Wooster
Attorney

UNITED STATES PATENT OFFICE.

ROBERT M. AUSTIN, OF DERBY, CONNECTICUT.

CULINARY DEVICE FOR FRYING OR ROASTING MEATS.

SPECIFICATION forming part of Letters Patent No. 638,860, dated December 12, 1899.

Application filed September 14, 1897. Serial No. 651,648. (No model.)

*To all whom it may concern:*

Be it known that I, ROBERT M. AUSTIN, a citizen of the United States, residing at Derby, in the county of New Haven and State of Connecticut, have invented a new and useful Culinary Article for Frying or Roasting Meats, of which the following is a specification.

My invention relates to improvements in culinary articles of that type employed in frying or roasting articles of food, particularly meat; and the object of my invention is to provide a device suitable for use in connection with a frying-pan and to be used either as a cover for said pan or to entirely contain the pan.

My invention consists in the device and the construction thereof, substantially as hereinafter described and claimed.

In the accompanying drawings, Figure 1 represents a perspective view of the device with the pan contained therein. Fig. 2 represents a similar view, but with my improvement employed as a cover for the pan. Fig. 3 is a bottom plan view showing the annular flange of one of the members of the device.

Similar reference characters indicate similar parts in all of the figures.

The device, which may be termed a "cover," is composed of two substantially semicylindrical parts or members, each part having a head or top, the two heads being pivoted together and one of said members being provided with means whereby it may be rotated relatively to the other in order that a complete cylindrical cover may be formed. The member A is formed with an opening of such size as to leave said member a practically semicylindrical one, the rim B being of but a slight height. The rotating member C has a top F, which is pivotally connected to the top D of the member A by the screw or pivot E. The member A may be termed the "relatively stationary" member in that in use it is not intended to be rotated relatively to the pan H, that may be placed within it or on which it may rest. The lower edge of the member A is provided with an annular flange G, preferably formed with small perforations, as shown in Fig. 3, said flange being adapted to rest upon the upper edge of a pan, as indicated in Fig. 2, and to be engaged by lugs J, carried by the pan; but said lugs may be omitted, if desired.

When a pan is placed within the device, as indicated in Fig. 1, said pan rests upon the flange G, and therefore the entire device, with the pan therein, may be lifted and moved from place to place by means of a handle, such as illustrated at I, secured to the top F of the outer member C.

The movable member C is provided with a slot or recess c, extending inward from one vertical edge just above the plane of the upper edge of the rim B of the member A, said slot or recess being adapted to closely fit the handle of the pan H when the latter is contained within the device and when the movable member is rotated, so as to close the open side of the member A. When the pan is so contained, the entire apparatus, including the pan, may be employed as a roaster in the oven of the stove, it being easy to place the entire apparatus in the oven or remove it therefrom by means of the handle I.

When the device is used as a cover for the pan, as indicated in Fig. 2, it may be used either for frying or steaming, as the small perforations within the flange G are within the margin of the upper edge of the pan. When so used, the movable member may be rotated far enough so that the slot or recess c moves to a position so as to entirely overlap the vertical wall of the member A, so that said slot or recess will be closed.

However, the apparatus may be used either on top of the stove or in an oven when the parts are relatively located or as shown in Fig. 1 or as shown in Fig. 2, according to the various results desired to be obtained by the cook. When the device is used either way, the contents of the pan are always easily accessible, and, as above stated, when the pan is located within the two semicylindrical members said members and the pan may be lifted and moved about by means of the handle I.

When the pan is placed within the members A and C, as shown in Fig. 1, it may be so placed above the opening in the range or cook-stove that steam, vapors, and odors are free to escape into the range through the small perforations in the flange G.

I claim—

1. A cover composed of two substantially semicylindrical members pivotally connected together, whereby one of said members is adapted to serve as a door to admit the pan to the interior of said cover, one of said members having a slot or recess to closely fit the pan-handle extending through it.

2. A cover composed of two substantially semicylindrical parts or members each member having a head or top the two heads being pivoted together and one of said members being provided with means for rotating it relatively to the other, whereby a complete cylindrical cover may be formed.

ROBERT M. AUSTIN.

Witnesses:
FREDERICK T. ROLFE,
WM. H. MAY.